Sept. 18, 1956 R. NAGY 2,763,567
METHOD OF FORMING AN INPUT SCREEN
Filed July 23, 1952
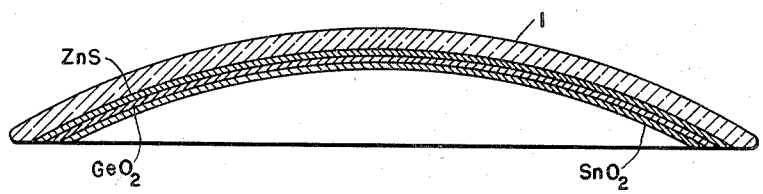
WITNESSES:
John E. Hensley
Manus W Dodd
INVENTOR
Rudolph Nagy.
BY
F. E. Browder
ATTORNEY

United States Patent Office 2,763,567
Patented Sept. 18, 1956

2,763,567
METHOD OF FORMING AN INPUT SCREEN

Rudolph Nagy, Upper Montclair, N. J., assignor to Westinghouse Electric Corporation, East Pittsburgh, Pa., a corporation of Pennsylvania Application July 23, 1952, Serial No. 300,427

5 Claims. (Cl. 117—33.5)

My invention relates to picture screens and in particular relates to screens comprising a thin layer of a phosphor or other fluorescent material. It is particularly useful in X-ray Image Intensifiers of the type described in Mason and Coltman Patent 2,523,132 in which a phosphor screen to be irradiated by X-rays is closely adjacent a cesiated antimony surface which would react chemically on the phosphor unless the latter were protected from such action. In such intensifiers an X-ray stream produces a luminous image in the phosphor layer, and the latter in turn generates an electron image in the cesiated surface.

Experience has shown that certain glasses, otherwise desirable to use for supporting the phosphor, apparently react with phosphors having properties optically advantageous, causing a loss of output-light and a shift in wavelength of the generated light from that characteristic of the unsullied phosphor. Impurities such as copper, nickel or iron present in the glass in an amount equal to one-millionth of the weight of the phosphor produce such effects.

One object of my invention is to provide a glass-supported phosphor layer in which deleterious reaction between the glass and the phosphor is prevented.

Another object is to provide a new and improved type of fluorescent screen.

Still another object is to provide a glass-supported phosphor layer in which exceedingly fine phosphor particles are used and are so disposed as to prevent scattering of the fluorescent light and yield an image of high definition.

Yet another object is to produce a phosphor layer in which the particles are protected from attack by active agents like the vapor of cesium present in the space about the layer.

Other objects of my invention will be apparent to those skilled in the art upon reading the following description taken in connection with the drawing which shows schematically a phosphor screen under the principles of my invention.

Referring in detail to the drawing, a support-plate 1 which may be of glass having the composition

| | Percent |
|---|---|
| $SiO_2$ | 80 |
| $Na_2O$ | 4 |
| $Al_2O_3$ | 2 |
| $B_2O_3$ | 14 | or some other composition which is free from substances reacting deleteriously on the optical and other properties of interest of the fluorescent material deposited thereon, is prepared by exposing its concave surface to hydrogen fluoride. This may be done by exposing the glass surface to 6–8% hydrofluoric acid solution at a temperature between 30 and 40 degrees centigrade. For phosphor screens of the type here described, I have found an exposure period of about five minutes to produce effective results. After such exposure the surface is washed thoroughly in dilute hydrochloric acid and then with distilled water.

The treated surface is then covered with a thin coating of a phosphor, the one used depending on the purpose for which the screen is to be used. Calcium tungstate may be mentioned as a phosphor used in many fluorescent screens but for the X-ray image intensifier described in the above-mentioned Mason and Coltman patent the phosphors zinc sulphide and zinc-cadmium sulphide have been found particularly suitable.

The particle size of the phosphor will again depend on the prospective use of the screen and there are various ways of obtaining particles of any desired size which are known to workers in the art. For the image intensifiers described in the above-mentioned patent particle sizes of 1 to 2 microns are desirable for most purposes although zinc sulphide particles averaging 20 microns in diameter are useful in some instances. Particles of any desired size may be deposited by stirring the powdered phosphor desired thoroughly in a liquid such as water containing 0.01 gram per 100 ml. of potash water glass ($K_2O.SiO_2$) and permitting the particles to settle through it. In accordance with Stokes' Law, the time required for particles of any given diameter to settle may be calculated with high precision, the larger particles settling faster than the smaller, of course. When the time required to reach particles of the desired diameter arrives, the treated glass plate may be placed in the bottom of the settling reservoir and left there until a layer of the desired thickness has deposited. For coating a 7 inch diameter screen as currently used in the image intensifier now being made by my assignee, a reservoir 9 inches in diameter is filled with about 3000 cubic centimeters of the water-glass solution just mentioned into which 20 grams of powdered zinc sulphide has been stirred. The glass plate 1 treated as described above is placed on the bottom of this reservoir about ½ minute after stirring ceases and allowed to remain for about 30 minutes.

After removal, the phosphor-coated plate 1 is allowed to dry and is subsequently baked, all in dust-free air, to a temperature of about 425° C.

A protective transparent film such as germanium oxide $GeO_2$, zinc sulphide $ZnS$, lithium fluoride $LiF$, or calcium fluoride $CaF_2$ is then applied to the phosphor surface by any suitable method such as supporting the glass plate, phosphor-side down, over a shallow crucible containing the coating substance and heated to a temperature at which it sublimes freely. To give the applied film a moderate electrical conductivity, it may contain a small percentage of some other substance; e. g., about 1.0 percent or less of silver. An alternative method, more satisfactory for many purposes, of attaining the desired conductivity for the screen surface is to coat it with a film of tin oxide $SnO_2$ by spraying a tin oxide solution on it while hot as described in John W. Coltman and R. L. Longini application Serial No. 149,121 filed March 11, 1952 for an Image Intensifier Tube. Still another method would be to evaporate a very thin layer of silver, chromium or manganese metal to import conductivity to the layer without any appreciable loss of light transmission.

I claim as my invention:

1. The method of forming a picture screen to be used in an environment containing cesium vapor which comprises the steps of exposing one surface of a glass member containing material which affects phosphor material adversely to a dilute solution of hydrofluoric acid, washing the treated surface with hydrochloric acid and water, settling fine particles of a phosphor on said surface from a liquid suspension thereof, coating the resulting surface with a layer of material selected from the group which consists of germanium dioxide, zinc sulphide, lithium fluoride and calcium fluoride and coating said layer with tin oxide.

2. The method for forming a picture screen which comprises the steps of exposing one surface of a glass member containing material which affects phosphor material adversely to a dilute solution of hydrofluoric acid, washing the treated surface with hydrochloric acid and water, settling fine particles of a phosphor on said surface from a liquid suspension thereof, and coating the resulting surface with a layer of material selected from the group which consists of germanium dioxide, zinc sulphide, lithium fluoride and calcium fluoride, and coating said layer with tin oxide.

3. The method of forming a luminescent screen, said method including the steps of exposing one surface of a glass member to hydrogen fluoride, said glas member containing material which affects phosphor material adversely, washing said surface with dilute hydrochloric acid and then with water, settling fine particles of a phosphor on said surface from a liquid suspension thereof, and coating the resulting surface by evaporization and condensation with a protective film of material selected from the group consisting of germanium dioxide, lithium fluoride and calcium fluoride.

4. The method of forming a luminescent screen, said method including the steps of exposing one surface of a glass member to dilute hydrochloric acid, said glass member containing material which affects phosphor material adversely, washing said surface with dilute hydrochloric acid and then with water, settling particles of zinc sulphide thereon from a solution of dilute potassium silicate, and coating the resulting surface by evaporization and condensation with a protective film of material selected from the group consisting of germanium dioxide, lithium fluoride and calcium fluoride.

5. The method of forming a luminescent screen to be used in an environment containing cesium vapor, said method including the steps of exposing one surface of a glass member to hydrogen fluoride, said glass member containing material which affects phosphor material adversely, washing said surface with dilute hydrochloric acid and then with water, settling fine particles of a phosphor on said surface from a liquid suspension thereof, and coating the resulting surface by evaporization and condensation with a protective film of material selected from the group which consists of potassium dioxide, lithium fluoride and calcium fluoride.

References Cited in the file of this patent

UNITED STATES PATENTS

| | | |
|---|---|---|
| 2,096,986 | Von Ardenne | Oct. 26, 1937 |
| 2,152,991 | Fairbrother | Apr. 4, 1939 |
| 2,315,329 | Hood et al. | Mar. 30, 1943 |
| 2,423,626 | Szegho | July 8, 1947 |
| 2,621,997 | Benes | Dec. 16, 1952 |
| 2,622,016 | Gilstrap et al. | Dec. 16, 1952 |